United States Patent
Zimmer et al.

(10) Patent No.: US 7,594,077 B2
(45) Date of Patent: *Sep. 22, 2009

(54) SYSTEM, METHOD AND APPARATUS TO ACCELERATE RAID OPERATIONS

(75) Inventors: Vincent J. Zimmer, Federal Way, WA (US); Michael A. Rothman, Puyallup, WA (US)

(73) Assignee: Intel Corporation, Santa Clara, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 11/530,246

(22) Filed: Sep. 8, 2006

(65) Prior Publication Data

US 2008/0065858 A1    Mar. 13, 2008

(51) Int. Cl.
*G06F 12/00* (2006.01)
(52) U.S. Cl. .................................... 711/114
(58) Field of Classification Search ........................ None
See application file for complete search history.

(56) References Cited

U.S. PATENT DOCUMENTS

| | | | |
|---|---|---|---|
| 7,007,036 B2* | 2/2006 | McCarty et al. | 707/102 |
| 7,293,197 B2* | 11/2007 | Jadon et al. | 714/14 |
| 7,370,175 B2* | 5/2008 | Zimmer et al. | 711/114 |
| 2006/0179279 A1* | 8/2006 | Jones et al. | 712/214 |

OTHER PUBLICATIONS

PCI Express Base Specification Revision 1.0, Jul. 22, 2002, 1479 pgs.
HyperTransport I/O Link Specification, Revision 3.00, Document # HTC20051222-0046-0008, 428 pgs., Apr. 21, 2006.
Serial AT: High Speed Serialized AT Attachment: Revision 1.0a, Jan. 7, 2003, APT Technologies, Inc., Dell Computer Corporation, IBM Corporation, Intel Corporation, Maxtor Corporation, Seagate Corporation, 116 pgs.
Information Technology—Serial Attached SCSI—1.1 (SAS-1.1), Working Draft American National Standard: Project T10/1601-D Revision 1, Sep. 18, 2003, 428 pgs.
Serial ATA II: Extensions to Serial ATA 1.0a Revision 1.2, Aug. 27, 2004, 110 pgs.
Unified Extensible Firmware Interface Specification, Version 2.0, 1437 pages, Jan. 31, 2006.
American National Standard: For Information Technology-Fibre Channel-Physical and Signalling Interface-3 (FC-PH-3) Developed by Incits, 1998; 116 pgs.

* cited by examiner

*Primary Examiner*—Hiep T Nguyen
(74) *Attorney, Agent, or Firm*—Grossman, Tucker, Perreault & Pfleger, PLLC

(57) ABSTRACT

A method according to one embodiment may include partitioning a plurality of core processors into a main partition comprising at least one processor core capable of executing a main operating system and an embedded partition comprising at least one different processor core configured to execute an embedded operating system. The method may also include exchanging, by the embedded partition, commands and data with a redundant array of independent disk (RAID) system coupled to the embedded partition; and generating by the embedded partition parity (P) data related to the RAID system.

24 Claims, 3 Drawing Sheets

SYSTEM, METHOD AND APPARATUS TO ACCELERATE RAID OPERATIONS

FIELD

The present disclosure relates to a system, method and apparatus to accelerate RAID operations, and more particularly, to partitioning processor cores to perform RAID-related operations.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
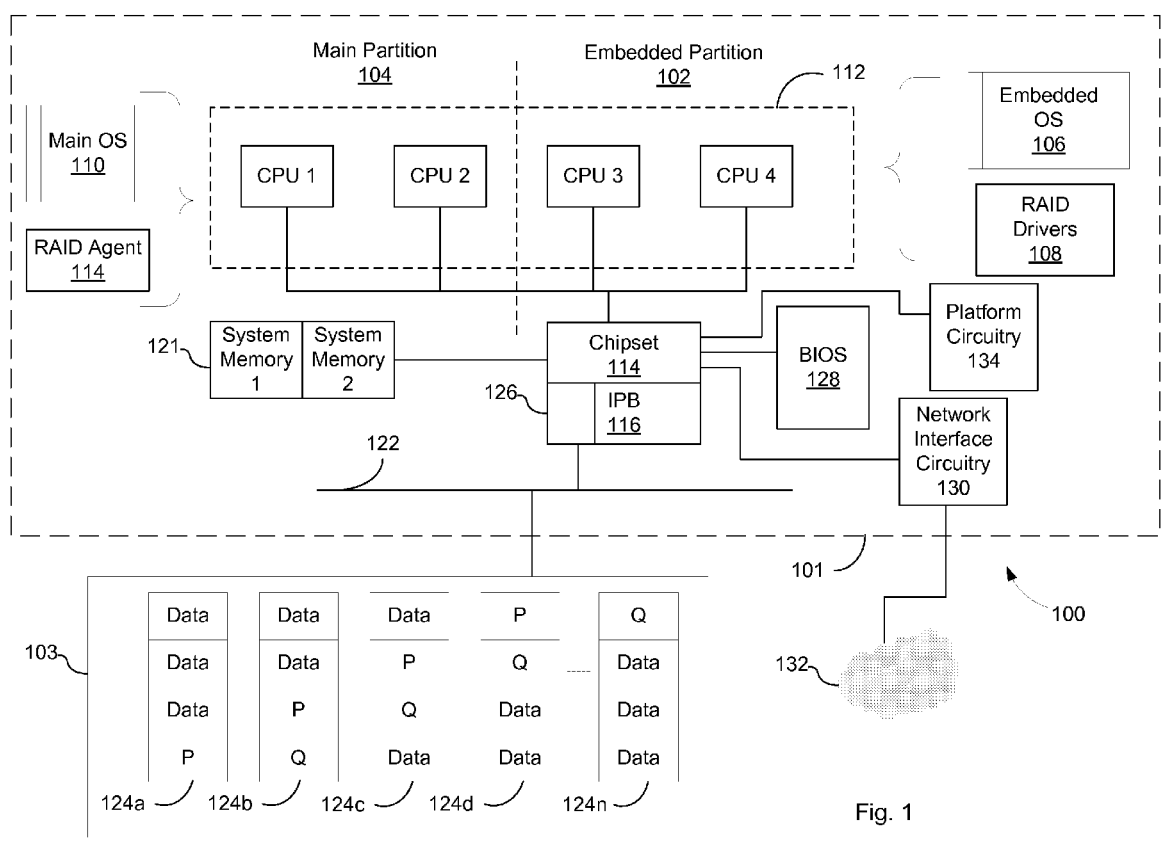
FIG. 1 is a diagram illustrating one exemplary system embodiment.

FIG. 1 a system embodiment 100 of the claimed subject matter. The system 100 may generally include a host system 101 configured to exchange commands and data with a redundant array of independent disks (RAID) system 103. The host system 101 may include a multiple core (multi-core) host processor 112, a chipset 114, and system memory 121. The multi-core host processor 112 may include any variety of processors known in the art having a plurality of cores, for example, an Intel® Pentium® D dual core processor commercially available from the Assignee of the subject application. Host processor 112 may comprise an integrated circuit (IC), such as a semiconductor integrated circuit chip.

In this embodiment, the multi-core processor 112 may include a plurality of core CPUs, for example, CPU1, CPU2, CPU3 and CPU4. Of course, additional or fewer processor cores may be used in this embodiment. The multi-core processor 112 may be logically and/or physically divided into a plurality of partitions. For example, in this embodiment, processor 112 may be divided into a main partition 104 that includes CPU1 and CPU2, and an embedded partition 102 that includes CPU3 and CPU4. The main partition 104 may be capable of executing a main operating system (OS) 110, which may include, for example, a general operating system such as Microsoft® Windows® XP, commercially available from Microsoft Corporation, and/or other "shrink-wrap" operating system such as Linux, etc. The main partition 104 may also be configured to execute a RAID agent application 114 (which may be part of the main OS 110). As will be described in greater detail below, the RAID agent 114 may be configured to intercept requests for RAID-related operations and pass those RAID-related operations to the embedded partition 102.

The embedded partition 102 may be capable of executing an embedded OS 106. As will be described in greater detail below, the embedded operating system 106 may be capable of controlling the operation of the RAID system 103 which may include exchanging commands and data with, and executing one or more RAID-related operations in connection with, one or more mass storage devices in the RAID system 103.

System memory 121 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 121 may comprise other and/or later-developed types of computer-readable memory. Machine-readable firmware program instructions may be stored in memory 121. As described below, these instructions may be accessed and executed by the main partition 104 and/or the embedded partition 102 of host processor 112. When executed by host processor 112, these instructions may result in host processor 112 performing the operations described herein as being performed by host processor 112. In this embodiment, memory 121 may be logically and/or physically partitioned into system memory 1 and system memory 2. System memory 1 may be capable of storing commands, instructions, and/or data for operation of the main partition 104, and system memory 2 may be capable of storing commands, instructions, and/or data for operation of the embedded partition 102.

Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. Chipset 114 may include inter-partition bridge (IPB) circuitry 124. "Circuitry", as used in any embodiment herein, may comprise, for example, singly or in any combination, hardwired circuitry, programmable circuitry, state machine circuitry, and/or firmware that stores instructions executed by programmable circuitry. The IPB 124 may be capable of providing communication between the main partition 104 and the embedded partition 102. Chipset 114 also may be coupled to a plurality of mass storage systems via communications link 122. In alternative embodiments, the chipset 114 and/or IPB 116 may be incorporated into the host processor 112. Further, the IPB 116 may be configured as a shared memory buffer between the main partition 104 and the embedded partition 102 and/or interconnect circuitry within, for example, chipset 114.

Host system 101 may also include system built-in operating system (BIOS) 128 that may include instructions to configure the system 101. In this embodiment, BIOS 128 may include instructions to configure the main partition 104 and the embedded partition 102 in a manner described herein using, for example, platform circuitry 134. Platform circuitry 134 may include platform resource layer (PRL) instructions that, when instructed by BIOS 128, may configure the host processor into partitions 102 and 104 and sequester one or more cores within each partition. The platform circuitry 134 may comply or be compatible with CSI (common system interrupt), Hypertransport™ (HT) Specification Version 3.0, published by the HyperTransport™ Consortium and/or memory isolation circuitry such as memory isolation circuitry such as a System Address Decoder (SAD) and/or Advanced Memory Region Registers (AMRR)/Partitioning Range Register (PXRR). This circuitry may be used, for example, to isolate the embedded partition 102 from the main partition 104 and/or to split system memory 121 to independently service the embedded partition 102 and the main partition 104, respectively.

RAID system 103 may include a plurality of mass storage devices (e.g., hard disk drives) 124a, 124b, 124c, 124d, . . . , 124n. The RAID level that may be implemented by RAID system 103 may be a RAID level 0, 1 or number greater than 1. For example, if RAID system 103 implements a RAID level 5, data and parity (P) information may be stripped and interleaved across the hard disk drives of the RAID system 103. If RAID system 103 implements a RAID level 6, data, parity (P) and Q syndrome error codes (Q) may be stripped and interleaved across the hard disk drives of the RAID system 103, as shown in FIG. 1.

In this embodiment, embedded partition 102 may be configured to perform RAID-related operations such as generating parity (P) data and Q syndrome data, instead of using the main OS 110 and main partition 104 and/or dedicated circuitry to perform these operations. RAID-related operations may include, for example, exclusive OR (XOR) operations to generate parity data (P) and Galois-field operations to generate the Q syndrome data. In this embodiment, one or more processor cores of the embedded partition 102 (e.g., CPU 3, CPU 4) may be configured to perform Reed-Solomon error coding in conjunction with the generation of the Q syndrome (which may include, for example, Galois-field operations). The Q syndrome may be used to recover data if two devices in the RAID system 103 fail. To that end, the embedded OS 106 may be configured to optimize at least one processor core of the embedded partition 102 to perform operations to generate Q syndrome data, for example, by dedicating at least one core of the embedded partition to generate the Q syndrome data.

The RAID system 103 may be coupled to chipset 114 via bus 122. The bus 122 may include various bus types to transfer data and commands. For instance, bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Of course, additional devices may be used to couple the RAID system 103 to bus 122. For example, a host bus adapter (HBA, not shown) and/or RAID controller (not shown) may be implemented on a circuit card coupled to bus 122 and RAID system 103. Alternatively, host system may include HBA and/or RAID controller circuitry to couple the RAID system 103 to bus 122 to permit the exchange of data and commands therebetween.

In this embodiment, embedded partition 102 may be capable of controlling the chipset 114 to exchange commands and/or data with the RAID system 103 coupled to chipset 114 using at least one of a plurality of communication protocols. If a Fibre Channel (FC) protocol is used by embedded partition 102 to exchange data and/or commands with RAID system 103, it may comply or be compatible with the interface/protocol described in "ANSI Standard Fibre Channel Physical and Signaling Interface-3 X3.303:1998 Specification." Alternatively or additionally, if a serial ATA (SATA) protocol is used by embedded partition 102 to exchange data and/or commands RAID system 103, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group earlier and/or later published versions of the SATA standard. Further alternatively or additionally, if a serial attached small computer system interface (SAS) protocol is used by embedded partition 102 to exchange data and/or commands with RAID system 103, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. Of course, other communication protocols may be used without departing from this embodiment.

To that end, the storage devices 124a, 124b, 124c, 124d, . . . , 124n comprised in the RAID system 103 may each comprise FC storage devices that comply or are compatible with the aforementioned FC communication protocol, SATA storage devices that comply or are compatible with the aforementioned SATA communication protocol and/or SAS storage devices that comply or are compatible with the aforementioned SAS communication protocol.

The embedded partition 102 may be capable of gathering information related to the RAID system 103 coupled to the chipset 114. Embedded partition 102 may also be capable of mapping two or more of the storage devices 124a,124b,124c, 124d, . . . , 124n or the RAID system 103 into a logical device 126. To that end, embedded partition 102 may be capable of generating a map that correlates logical block address (LBA) information of at least two of the storage devices of the plurality of RAID system 103 and the LBA information of the logical device 126. The logical device 126 may include, for example, a single large extended device (SLED). The logical device 126 may be stored in the IPB 124, so that the main partition 104 can access the logical device 126.

As stated, the embedded partition 102 may be capable of executing an embedded OS 106. The embedded OS 106 may include, for example, a Berkely Software Distribution (BSD) operating system. For example, OS 106 may comply or be compatible with OpenBSD Version 3.9, Released May 1, 2006 by the OpenBSD Organization and/or earlier and/or later versions of the OpenBSD operating system. Alternatively or additionally, OS 106 may comply or be compatible with NetBSD® Release 3.0.1, Released Aug. 17, 2006 by the NetBSD® Foundation, Inc. and/or earlier and/or later versions of the NetBSD® operating system. Alternatively or additionally, OS 106 may comply or be compatible with FreeBSD Release 6.1, Released May 8, 2006 by the FreeBSD Project and/or earlier and/or later versions of the FreeBSD operating system. Alternatively or additionally, OS 106 may also comply or be compatible with Linux Operating System, Version 2.6, Released Jun. 18, 2006 by the Linux Organization and/or earlier and/or later versions of the Linux operating system. Alternatively or additionally, OS 106 may comply or be compatible with Microsoft® Windows® CE (WinCE) operating system Version 5.0, commercially available from Microsoft Corporation, and/or earlier and/or later versions of the WinCE operating system. Alternatively or additionally, OS 106 may comply or be compatible with VxWorks operating system Version 1.0, commercially available from Wind River Corporation, and/or earlier and/or later versions of the VxWorks operating system operating system. Alternatively or additionally, OS 106 may comply or be compatible with ThreadX® operating system Version 1.0, commercially available from Express Logic, Inc., and/or earlier and/or later versions of the ThreadX® operating system operating system. Alternatively or additionally, OS 106 may comply or be compatible with RTLinux® operating system Version 3.0, commercially available from FSM Labs, Inc., and/or earlier and/or later versions of the RTLinux® operating system. Of course, OS 106 may comply or be compatible with different operating systems (such as, for example, alternative run time and/or real time operating systems) without departing from this embodiment. Further, embedded partition 102 may be configured to operate without an operating system, using, for example, Extensible Firmware Interface (EFI) that complies or is compatible with the Extensible Firmware Interface Specification, Version 2.0, Released Jan. 31, 2006 by the Unified EFI (UEFI) Forum and/or earlier and/or later versions of the EFI specification.

In operation, one or more cores of the embedded partition 102 may execute one or more RAID drivers 108 to control the operation of RAID system 103 coupled to the chipset 114. Thus, RAID I/O traffic for the plurality of RAID system 103 may be processed through the embedded partition 102. Even though a given RAID system may employ similar RAID levels, different vendors may use different encoding specific to their own RAID systems. These encodings may be reflected in the RAID drivers 108. The encodings may be associated with the metadata on the drives that allow for the interpreting the RAID set. The encodings may include, but are not limited to, the strip-size, RAID level (e.g., RAID level 0-6), logical volume size, drive-to-logical-volume mapping, etc. RAID drivers 108 may also configure the embedded partition 102 to execute RAID-related operations, as described herein.

During operation, the main OS 110 may be capable of generating one or more I/O requests (e.g., read and/or write requests) directed to the logical device 126. To that end, the main partition 104 may be capable of communicating with the logical device 126 using a plurality of communication protocols. For example, the main partition 104 may be capable of communicating with the logical device 126 using the aforementioned SATA communications protocol and/or parallel ATA (PATA) communications protocol.

In response to an I/O request generated by the main partition 104 directed to the logical device 126, the IPB 124 may generate an interrupt to the embedded partition 102 to process the I/O request generated by the main OS 110. In response to the interrupt generated by the IPB 124, the embedded partition 102 may be capable of performing the I/O operation by communicating with the RAID system 103. The embedded partition 102 may also be capable of translating the I/O request from the communication protocol as may be generated by the main partition 104 into a communication protocol compatible with the RAID system 103. Once the I/O transaction is complete (or if the I/O transaction fails), the embedded partition 102 may be capable of reporting the status of the I/O transaction to the main partition 104, via the IPB 124. The embedded partition 102 may queue a series of I/O requests and dispatch them out-of-order or in-order, even if the underlying I/O device does not support out-of-order or multiple outstanding transactions (e.g., SCSI tagged command queuing).

Thus, while the embedded partition 102 may be capable of controlling I/O transactions with the RAID system 103 coupled thereto, the main partition 104 may be capable of I/O transactions with the logical device 126, via the IPB 124. This may enable, for example, the RAID system 103 to be concealed from the main partition 104. The may also enable the plurality of RAID drivers 108 (corresponding to the RAID system 103) to be concealed from the main partition 104.

As an example, the main OS 104 may issue a request to write data to the RAID system 103. The request may be passed to the IPB 116 and in turn, passed to the embedded partition 102. In response thereto, and to comply with redundancy and/or error recovery requirements of the RAID system 103, the embedded partition 102 may be configured to generate parity data (P) and Q syndrome data (Q). Embedded partition 102 may, in turn, execute I/O commands with RAID system 103 to write data, parity information (P) and the Q syndrome to the storage devices 124a, 124b, 124c, . . . , and/or 124n, in a manner consistent with the RAID level implemented by RAID system 103. This operation may include, for example, stripping and interleaving data, parity data and Q syndrome data across the storage devices of the RAID system 103 according to the RAID level being implemented. For communication from the RAID system 103 to the host system 101, the RAID agent 114 may intercept commands and data from the RAID system 103 and pass those commands and data to the embedded partition 102, via the IPB 116.

Host system 101 may also include network interface circuitry 130 configured to communicate with a network 132. Network 132 may include, for example, a local area network (LAN), wide area network (WAN) and/or Internet network. In at least one embodiment herein, embedded partition 102 may be configured to receive update information and/or additional information related to the embedded OS 106 and/or RAID drivers 108 from a remote location (i.e., a location external to host system 101), via network interface circuitry 130. Updates may include, for example, patches and/or functional enhancements. In addition, embedded partition 102 may be configured to update the embedded OS independently of the main operating system 110.

Figure 2:
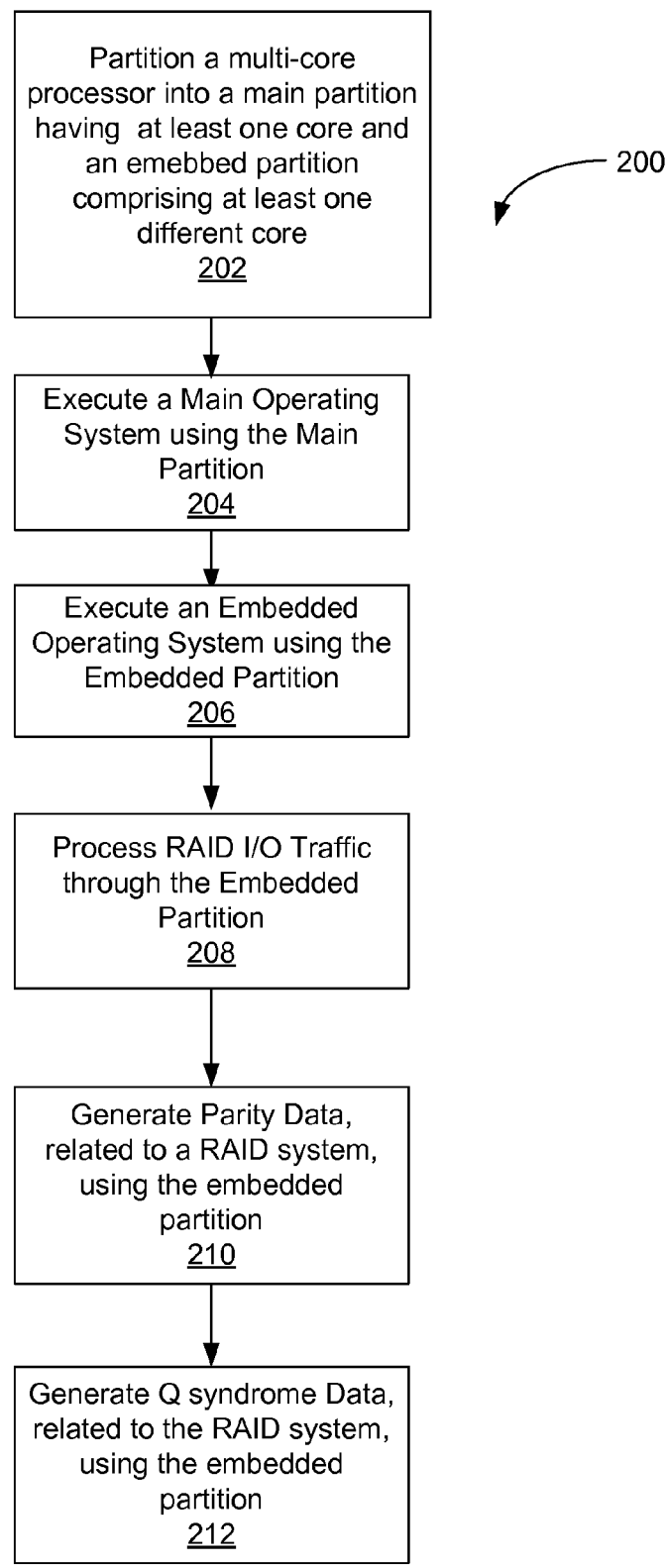
FIG. 2 is a flowchart of one exemplary method according to one embodiment.

FIG. 2 is a flowchart 200 illustrating one exemplary method that may be performed according to one embodiment. The method of this embodiment may include partitioning a multi-core processor into a main partition having at least one core and an embedded partition having at least one different core 202. This method may also include executing a main operating system using the main partition 204, and executing an embedded operating system using the embedded partition 206. This method may also include processing RAID I/O traffic through the embedded partition 208. This method may also include generating parity data, related to a RAID system, using the embedded partition 210. This method may also include generating Q syndrome data, related to the RAID system, using the embedded partition 212.

Figure 3:
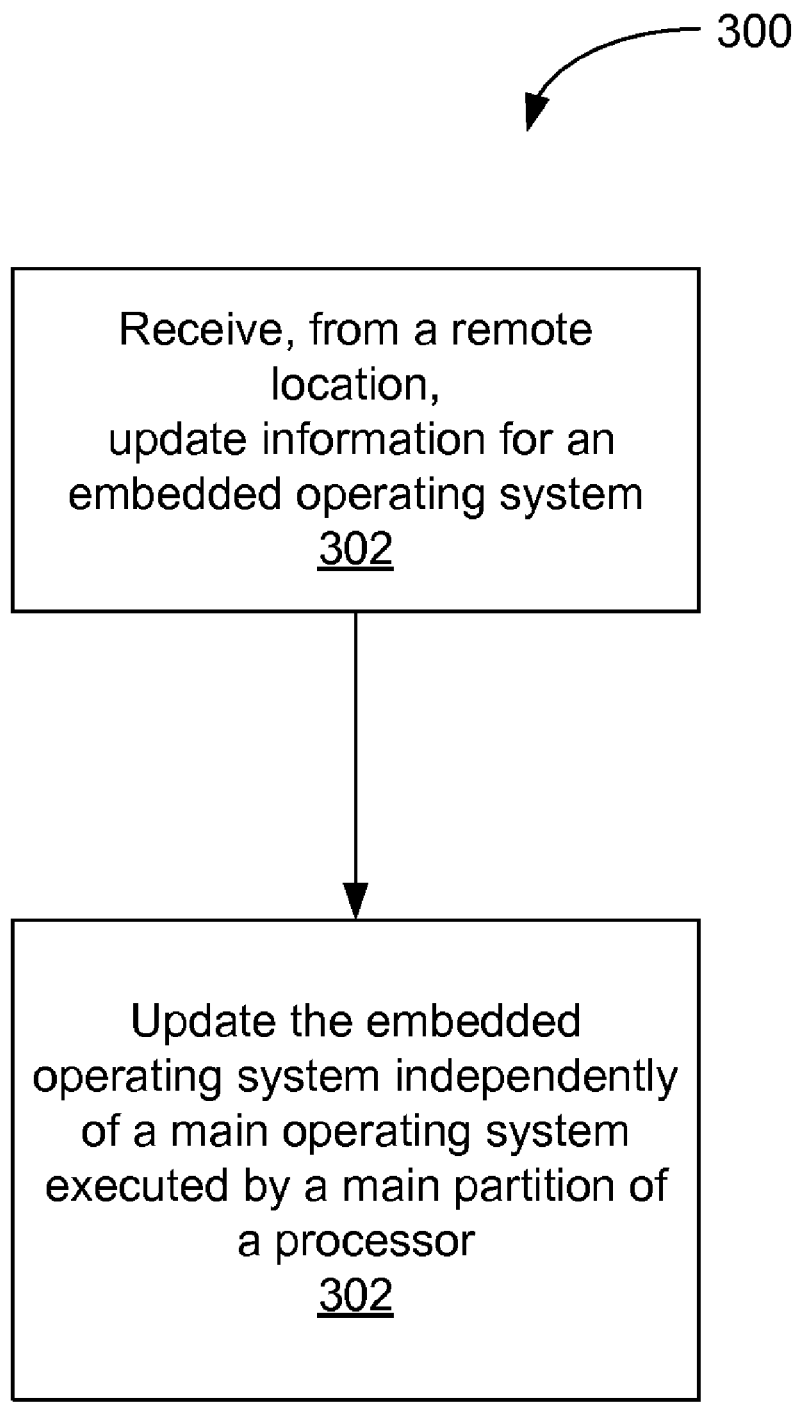
FIG. 3 is a flowchart of one exemplary method according to another embodiment.

FIG. 3 is a flowchart illustrating one exemplary method 300 that may be performed according to another embodiment. The method of this embodiment may include receiving, from a remote location, update information for an embedded operating system 302. The method of this embodiment may also include updating the embedded operating system independently of a main operating system executed by a main partition of a processor 302.

In any of the embodiments described herein, the methods may further include reporting the status of the I/O request to the main operating system, via an inter-partition bridge. These operations may include synchronous I/O commands from main partition and a response with data from the embedded partition, and/or a plurality of these I/O requests can be batched by the embedded partition and issued in a variety of ways, for example ordered based upon latest disk head location via known sorting mechanisms for disk-drive scheduling (such as the "elevator algorithm").

Embodiments of the methods described above may be implemented in a computer program that may be stored on a storage medium having instructions to program a system (e.g., computer system and/or a machine) to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Thus, in summary, at least one embodiment herein may include a processor comprising a plurality of processor cores. The processor may include a main partition comprising at least one processor core configured to execute a main operating system and an embedded partition comprising at least one different processor core configured to execute an embedded operating system. The embedded partition may be further configured to exchange commands and data with a redundant array of independent disk (RAID) system coupled to the embedded partition and to generate parity (P) data related to the RAID system.

Advantageously, the systems, methods, and apparatus of the embodiments described herein may provide accelerated RAID-related operations (e.g., generating parity data and Q syndrome data) without requiring additional hardware or burdening the main operating system and main partition with additional software to support these operations. Thus, for example, the main partition may issue RAID-related instructions to the embedded partition, thus freeing the main partition from RAID-related processing tasks. Further advantageously, the embedded partition may be configured to receive updates independently of the main operating system. This may enable, for example, updates and enhancements of the RAID-related functionality performed by the embedded partition without requiring a main operating system re-installation or service pack update.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
a processor comprising a plurality of processor cores, said processor having a main partition comprising at least one processor core configured to execute a main operating system and an embedded partition comprising at least one different processor core configured to execute an embedded operating system, the embedded partition is further configured to exchange commands and data with a redundant array of independent disk (RAID) system coupled to the embedded partition and to generate parity (P) data related to the RAID system.

2. The apparatus of claim 1, wherein:
said embedded partition is further capable of executing drivers associated with said RAID system.

3. The apparatus of claim 1, wherein:
said main partition is further configured to intercept commands and/or data from said RAID system and pass the commands and/or data to said embedded partition.

4. The apparatus of claim 1, further comprising:
an inter-partition bridge configured to provide communication between said embedded partition and said main partition.

5. The apparatus of claim 1, wherein:
said embedded partition is further configured to update said embedded operating system independently of said main operating system executed by said main partition.

6. The apparatus of claim 1, wherein:
said embedded partition is further configured to generate Q syndrome data related to said RAID system.

7. A system, comprising:
a redundant array of independent disks (RAID) system comprising a plurality of serial ATA (SATA) storage devices; and
a host system comprising a processor comprising a plurality of processor cores, said processor having a main partition comprising at least one processor core configured to execute a main operating system and an embedded partition comprising at least one different processor core configured to execute an embedded operating system, the embedded partition is further configured to exchange commands and data with a redundant array of independent disk (RAID) system coupled to said host system and to generate parity (P) data related to said RAID system.

8. The system of claim 7, wherein:
said embedded partition is further capable of executing drivers associated with said RAID system.

9. The system of claim 7, wherein:
said main partition is further configured to intercept commands and/or data from said RAID system and pass the commands and/or data to said embedded partition.

10. The system of claim 7, further comprising:
an inter-partition bridge configured to provide communication between said embedded partition and said main partition.

11. The system of claim 7, wherein:
said embedded partition is further configured to update said embedded operating system independently of said main operating system executed by said main partition.

12. The system of claim 7, wherein:
said embedded partition is further configured to generate Q syndrome data related to said RAID system.

13. An article, comprising:
a storage medium storing instructions that when executed by a machine result in the following operations:
partitioning a plurality of core processors into a main partition comprising at least one processor core capable of executing a main operating system and an embedded partition comprising at least one different processor core configured to execute an embedded operating system,
exchanging, by the embedded partition, commands and data with a redundant array of independent disk (RAID) system coupled to said embedded partition; and
generating by said embedded partition parity (P) data related to said RAID system.

14. The article of claim 13, further comprising:
executing drivers, by the embedded partition, associated with said RAID system.

15. The article of claim 13, further comprising:
intercepting, by said main partition, commands and/or data from said RAID system and passing the commands and/or data to said embedded partition.

16. The article of claim 13, further comprising:
configuring an inter partition bridge to provide communication between said embedded partition and said main partition.

17. The article of claim 13, further comprising:

updating, by said embedded partition, said embedded operating system independently of said main operating system executed by said main partition.

18. The article of claim 13, further comprising:

generating, by said embedded partition, Q syndrome data related to said RAID system.

19. A method, comprising:

partitioning a plurality of core processors into a main partition comprising at least one processor core capable of executing a main operating system and an embedded partition comprising at least one different processor core configured to execute an embedded operating system, exchanging, by the embedded partition, commands and data with a redundant array of independent disk (RAID) system coupled to said embedded partition; and generating by said embedded partition parity (P) data related to said RAID system.

20. The method of claim 19, further comprising:

executing drivers, by the embedded partition, associated with said RAID system.

21. The method of claim 19, further comprising:

intercepting, by said main partition, commands and/or data from said RAID system and passing the commands and/or data to said embedded partition.

22. The method of claim 19, further comprising:

configuring an inter partition bridge to provide communication between said embedded partition and said main partition.

23. The method of claim 19, further comprising:

updating, by said embedded partition, said embedded operating system independently of said main operating system executed by said main partition.

24. The method of claim 19, further comprising:

generating, by said embedded partition, Q syndrome data related to said RAID system.

* * * * *